United States Patent
Wallace et al.

(10) Patent No.: US 6,862,434 B2
(45) Date of Patent: Mar. 1, 2005

(54) TRANSMISSION DIVERSITY SYSTEMS

(75) Inventors: Mark Wallace, Bedford, MA (US); Stein A. Lundby, Solana Beach, CA (US)

(73) Assignee: Qualcomm Inc., San Diego, CA (US)

( * ) Notice: Subject to any disclaimer, the term of this patent is extended or adjusted under 35 U.S.C. 154(b) by 175 days.

(21) Appl. No.: 10/205,685

(22) Filed: Jul. 26, 2002

(65) Prior Publication Data

US 2004/0018855 A1 Jan. 29, 2004

(51) Int. Cl.[7] .................................................. H04B 1/02
(52) U.S. Cl. ................. 455/101; 455/277.1; 455/102; 375/299
(58) Field of Search ............................. 455/101–102, 455/91, 561, 562.1, 73, 103, 277.1, 277.2; 375/146, 267, 299, 260; 342/423, 463, 464

(56) References Cited

U.S. PATENT DOCUMENTS

| 4,601,046 A | * | 7/1986 | Halpern et al. ............. 375/260 |
|---|---|---|---|
| 4,901,307 A | | 2/1990 | Gilhousen et al. |
| 5,103,459 A | | 4/1992 | Gilhousen et al. |
| 5,119,501 A | * | 6/1992 | Perry et al. ............... 455/562.1 |
| 5,553,102 A | * | 9/1996 | Jasper et al. ................ 375/347 |
| 6,141,536 A | * | 10/2000 | Cvetkovic et al. ............ 455/45 |
| 6,539,209 B1 | * | 3/2003 | Dajer et al. ................. 455/101 |
| 6,636,495 B1 | * | 10/2003 | Tangemann ................. 370/334 |

FOREIGN PATENT DOCUMENTS

EP  1 160 997 A2  12/2001

* cited by examiner

*Primary Examiner*—Sonny Trinh
(74) *Attorney, Agent, or Firm*—Philip R. Wadsworth; Thien Nguyen; Rupit Patel

(57) ABSTRACT

Methods and apparatus are presented to provide transmit diversity gains to non-transmit diversity configured remote stations by correlating the magnitude of the interference between at least two antenna paths. A first time-varying transformation is applied to a stream of modulation symbols to form a first transmission signal and a second time-varying transformation is applied to the stream of modulation symbols to form a second transmission signal, wherein the second time-varying transformation has a different relative phase from the first time-varying transformation.

17 Claims, 4 Drawing Sheets

TRANSMISSION DIVERSITY SYSTEMS

BACKGROUND

1. Field

The present invention relates generally to wireless communications, and more specifically, to providing gains associated with transmission diversity to all remote stations within a transmission diversity system.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communications systems that can be implemented. Most of these systems are now configured to use a single antenna for forward link transmissions to a single remote station, but it is envisioned that multiple antennas will eventually be used for forward link transmissions to a single remote station. Multiple antennas provide transmit diversity (TD), which increases the quality of the forward link. When the quality of the forward link improves, less transmission power is required to convey information to a remote station. Hence, more information can be conveyed using the same transmission power, and the overall data throughput of the link is increased. As used herein, the term "forward link" refers to transmissions from a base station to a remote station while the term "reverse link" refers to transmissions from a remote station to a base station.

In transmission diversity systems, antenna phase information and amplitude information are acquired by a remote station through a pilot channel transmitted from each antenna. One of the antennas is considered to be the primary antenna, whereas the other antennas are considered to be the auxiliary antennas. For illustrative ease only, the embodiments that follow will be described as two-antenna systems. The number of antennas can be extended without affecting the scope of the embodiments described herein.

A problem arises with the deployment of systems offering transmission diversity. Namely, while a communication system may be upgraded to utilize multiple antennas, the remote stations operated by individual users may not keep pace with the system upgrades. The current state of the art envisions a system that can support a non-TD remote station by using the primary channel alone. Since almost all wireless communication systems require the transmission of characterizing information from the remote station to a serving base station, a TD base station can easily be notified that transmissions to a non-TD remote station should be sent only on the primary channel. The modulation at the base station can then be altered accordingly.

However, the current method of transmitting only on the primary channel to a non-TD remote station is flawed. The flaw arises from the deleterious effects of interference between antenna transmission paths when both a non-TD remote station and a TD remote station are operating in a system with transmission diversity. In spread spectrum communication systems, such as, e.g., CDMA and WCDMA, orthogonal and quasi-orthogonal codes, such as the Walsh code sequences, are used to channelize the information sent to each remote station on the forward link. In other words, Walsh code sequences are used on the forward link to allow the system to overlay multiple users, each assigned a different orthogonal or quasi-orthogonal code, on the same frequency during the same time duration.

Hence, the signals originating from one antenna transmission are orthogonal and the magnitude of the interference between these orthogonal signals is correlated. However, even though the signals originating from multiple antennas may be orthogonal, the magnitude of the interference between one antenna transmission path and another antenna transmission path is not correlated. If the magnitude of the interference between the various antenna paths is not correlated, then the transmission gains arising from combining multipaths are no longer present for non-TD remote stations. A more detailed explanation of this phenomenon is presented below.

Since a base station with transmission diversity will be transmitting to both TD remote stations and non-TD remote stations during the same time duration and on the same frequencies, it follows that the performance of a non-TD remote station suffers greatly when operating amidst TD remote stations. Therefore, there is a need in the art for methods and apparatus that allow a non-TD remote station to operate within a transmission diversity system in a manner that does not impair the quality of the received forward link transmissions.

SUMMARY

Methods and apparatus are presented herein to address the above stated needs. In one aspect, an apparatus is presented for providing transmission diversity gains to a non-transmission diversity receiver, the apparatus comprising: a switching apparatus for implementing at least two time-varying transformations to a single stream of modulation symbols so that the single stream of modulation symbols is transformed into at least two time-varying streams of modulation symbols; and at least two antennas for transmitting each of the at least two time-varying streams of modulations symbols to the non-transmission diversity receiver.

In another aspect, a method is presented for providing transmission diversity gains to a non-transmission diversity receiver, the method comprising: implementing a first time-varying transformation to a stream of modulation symbols to form a first transmission signal; implementing a second time-varying transformation to the stream of modulation symbols to form a second transmission signal, wherein the second time-varying transformation has a different relative phase from the first time-varying transformation; and transmitting the first transmission signal and the second transmission signal to the non-transmission diversity receiver.

In another aspect, an apparatus is presented for allowing non-transmission diversity remote stations to operate amidst transmission diversity remote stations in a transmission diversity system, the apparatus comprising: a switching apparatus for implementing at least four time-varying transformations to streams of modulation symbols, wherein the first stream of modulation symbols is for a non-transmission diversity remote station and the remaining streams of modulation symbols are for a transmission diversity remote station; and at least two antennas for transmitting each of the transformed streams of modulations symbols.

In another aspect, a method is presented for allowing non-transmission diversity remote stations to operate amidst transmission diversity remote stations in a transmission diversity system, the method comprising: implementing a first time-varying transformation upon a primary stream of modulation symbols and a secondary stream of modulation symbols to form a part of a first transmission signal, wherein the primary stream of modulation symbols is for a non-transmission diversity remote station and the secondary stream of modulation symbols is for a transmission diversity remote station; implementing a second time-varying transformation upon the primary stream of modulation symbols and the secondary stream of modulation symbols to form a part of a second transmission signal, wherein the second time-varying transformation has a different relative phase from the first time-varying transformation; implementing a third time-varying transformation to a tertiary stream of modulation symbols to form another part of the first transmission signal, wherein the tertiary stream of modulation symbols is for the transmission diversity remote station; implementing a fourth time-varying transformation to the tertiary stream of modulation symbols to form another part of the second transmission signal; and transmitting the first transmission signal and the second transmission signal to the non-transmission diversity remote station and the transmission diversity remote station.

DETAILED DESCRIPTION

Figure 1:
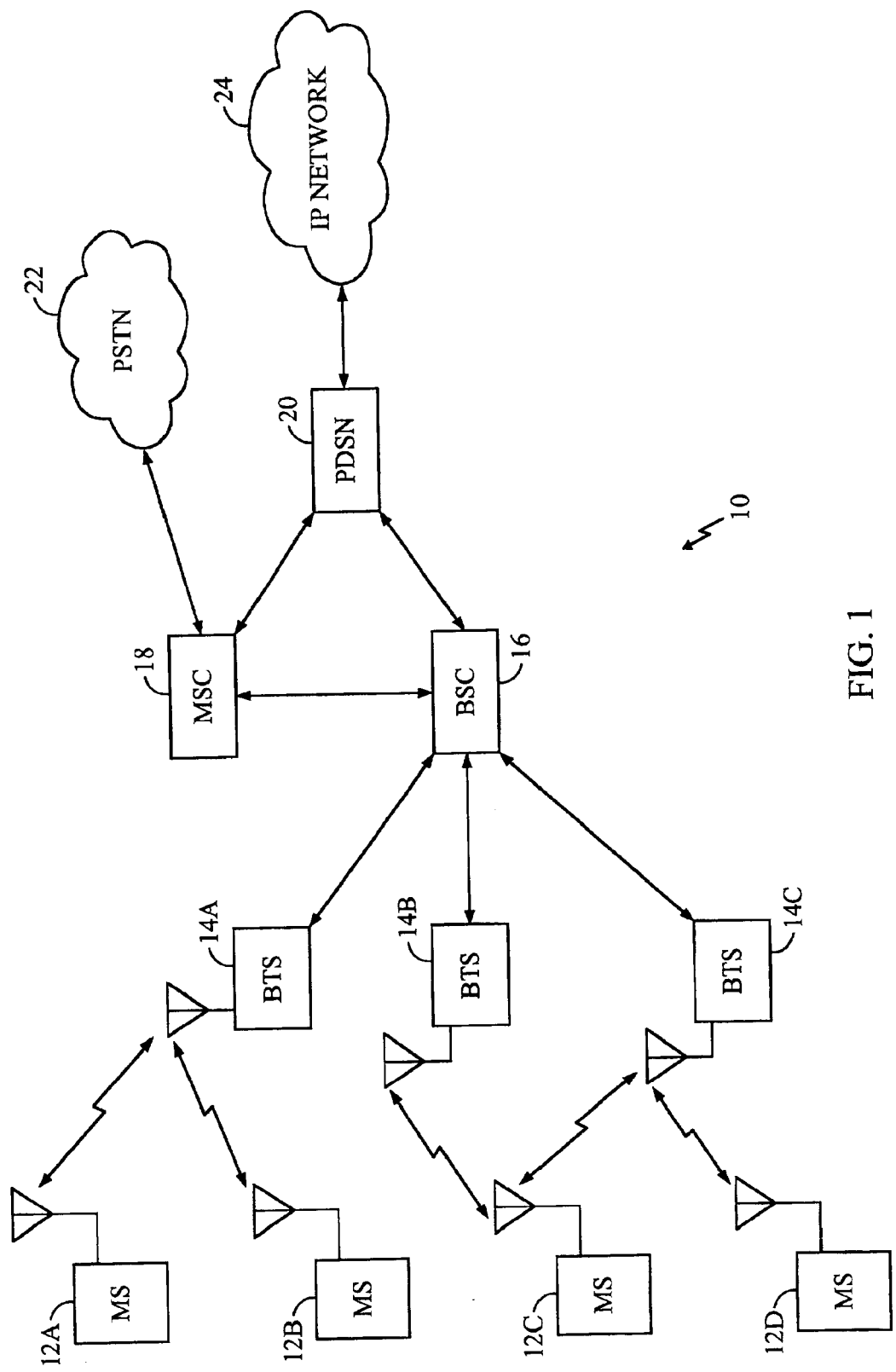
FIG. 1 is a diagram of a wireless communication network.

As illustrated in FIG. 1, a wireless communication network 10 generally includes a plurality of remote stations (also called subscriber units or mobile stations or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a–12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, remote stations may be any type of communication unit.

The remote stations 12a–12d may advantageously be configured to perform one or more wireless packet data protocols such as described in, for example, the EIA/TIA/IS-707 standard. In a particular embodiment, the remote stations 12a–12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of uplink signals from various remote stations 12a–12d engaged in telephone calls, Web browsing, or other data communications. Each uplink signal received by a given base station 14a–14c is processed within that base station 14a–14c. Each base station 14a–14c may communicate with a plurality of remote stations 12a–12d by modulating and transmitting sets of downlink signals to the remote stations 12a–12d. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UTMS Terrestrial Radio Access Network (U-TRAN), wherein "UTMS" is an acronym for Universal Mobile Telecommunications Systems.

The transmitted signals in communication systems are inherently prone to degradations such as channel noise and interference. Depending on the level of channel noise and interference, the transmitted data may or may not be recoverable at the receiver. Various Error Control Coding (ECC) techniques exist for increasing the overall robustness of the communication system to noise and interference from the channel. The basic idea behind such techniques is to introduce redundant information in the stream of transmitted data. If errors were to occur in the reception of the transmitted signal, the data may still be recovered by exploiting this redundancy.

An example of an ECC technique is convolutional coding. In convolutional coding, binary data bits are input to a finite state machine (FSM), which produces one or more binary outputs for every input data bit. The outputs of this FSM are called code symbols. A typical method for constructing such an FSM is through one or more convolutional encoders, i.e., finite impulse response (FIR) binary digital filters operating using arithmetic in the Galois Field GF(2). If the code symbols are corrupted by noise and interference during transmission over a noisy channel, the data bits may still be recoverable through suitable inferences based upon the corrupted code symbols. Inferences are possible because the code symbols are "redundant", i.e., the code symbols contain information about not only the input data bits but also the "internal state" of the FSM. Methods for optimally inferring the input data bits from the received code symbols are known in the art and are commonly referred to as Trellis Decoding Algorithms, e.g., the Viterbi Algorithm, or the Stack Algorithm.

Another example of an ECC technique is turbo coding. Turbo coding employs two or more convolutional encoders in parallel, in series, or in a combination thereof. The resulting sequence of code symbols also possesses redundant information about the input data bits. Furthermore, methods for optimally inferring the input data bits from the received code symbols are known in the art and are commonly referred to as turbo decoding algorithms.

In a typical communication system, a "source" generates a stream of information bits representing, for example, voice or data "traffic". This stream of bits is subdivided and grouped, various control bits are appended, and the result is packed into a suitable format for transmission. Voice and data traffic can be transmitted in various formats, such as, e.g. frames, packets, and subpackets. The scope of the embodiments described herein extends to all wireless communication systems using any of the various transmission formats. However, for the purpose of illustrative ease, the term "frame" will be used herein to describe the transmission format in which traffic is carried.

In a typical CDMA spread spectrum communication system, frames comprising bits are convolutionally or turbo encoded, repeated, and punctured to produce a sequence of binary code symbols. The resulting code symbols are interleaved to obtain a frame of modulation symbols. The output of the interleaver is referred to herein as modulation symbols. The modulation symbols are then Walsh covered and combined with a pilot sequence on the orthogonal-phase branch, PN-spread, baseband filtered, and modulated onto the transmit carrier signal.

The signal propagates to the receiver over multiple transmission paths and is received as a superposition of multiple components, each with its own amplitude, phase and time delay. These multiple transmission paths are referred to as "multipaths" and are commonly caused by reflections off objects present in the transmission path. At the receiver, the signal is match-filtered, sampled, digitized and down-converted to complex baseband before it is fed to a searcher and a RAKE processor. The searcher usually determines the time delays of the multipath components in the received signal. The RAKE processor comprises multiple "fingers", each of which is synchronized to the time delay of a particular multipath component. Each RAKE finger is configured to PN-despread the sampled and digitized waveform using the PN code synchronized to that finger's particular time delay. Additionally, each RAKE finger is able to perform Walsh de-covering to separate the modulation symbols from the orthogonal pilot symbols.

The received modulation and pilot symbols are complex vectors of length L, where L is the number of fingers in the RAKE processor. When L RAKE fingers are assigned to L different multipath components in the received signal, the situation is sometimes called multipath diversity.

When the same modulation symbols are transmitted on different frequency bands or on different carriers, RAKE fingers are assigned to different multipath components on different carriers. This method is called frequency or carrier diversity.

When the same modulation symbols are repeated or retransmitted in future frames or time slots, RAKE fingers are assigned to different multipath components on the different time slots. This is sometimes known as time diversity.

When multiple, spatially separated antennas are used for transmission, RAKE fingers are assigned to different multipath components received from different antennas. This method is commonly known as transmit, spatial, or antenna diversity. For example, if $L_1$ RAKE fingers are assigned to multipath components on a first antenna, and $L_2$ RAKE fingers are assigned to multipath components on a second antenna, then $L=L_1+L_2$. With transmission diversity, more modulation symbols can be transmitted to a receiver, which increase the data throughput of the system. In addition, transmission diversity increases the robustness of the communications system to noise and interference by providing alternative signal paths. For example, if a transmission from one antenna to a remote station fails due to a physical blockage, i.e., a tree or building, it is likely that a transmission from another antenna may reach the remote station instead. Hence, transmission diversity increases the reliability of the connection, which on average, needs less transmission power.

In the cdma2000 standard, two types of transmission diversity systems are offered. The first type of transmission diversity system is referred to as an Orthogonal Transmit Diversity (OTD) system, wherein the evenly-numbered modulation symbols are transmitted on a first antenna and the odd-numbered modulation symbols are transmitted on a second antenna. Hence, half of the modulation symbols are sent on each antenna. The transmissions from the antennas are separated by the use of different Walsh codes for each antenna.

The second type of transmit diversity system is referred to as a Space-Time Spreading (STS) system. In an STS system, all modulation symbols are sent on all antennas. The transmissions from the antennas are modulated using an "Alamouti" matrix, which allows the separation and combining of two modulation symbols at a time by a remote station.

A problem arises for non-TD remote stations that operate within systems that are configured for transmission diversity. In a system with transmission diversity, the signals within a path are orthogonal and the interference between the orthogonal signals is correlated with the magnitude of the signal. However, even though the signals over multiple antenna paths may be orthogonal, the interference between one antenna transmission path and another antenna transmission path is not necessarily correlated. If the magnitude of the interference between the various antenna paths is not correlated, then the transmission gains arising from combining multipaths are no longer present.

As an example of this correlation phenomena, suppose that a non-TD system with a single antenna transmits to a receiver. The receiver sees a signal with a signal strength of $A_1$ and noise that is 10% of $A_1$. Then the signal to noise ratio (SNR) is:

$$\frac{S}{N} = \frac{A_1}{0.10 A_1} = 10.$$

The signal and the noise are correlated in the above example. Suppose that a TD system with two antennas uses one of the antennas to transmit to a receiver. The receiver sees a signal with a signal strength of $A_1$ and noise that is 10% of $(A_1+A_2)$, wherein $A_2$ is the signal strength of the second antenna transmitting to another receiver. Then the SNR is:

$$\frac{S}{N} = \frac{A_1}{0.10(A_1 + A_2)} = 10 \frac{A_1}{(A_1 + A_2)}.$$

The signal and the noise are not correlated due to the influence of $A_2$.

Figure 2:
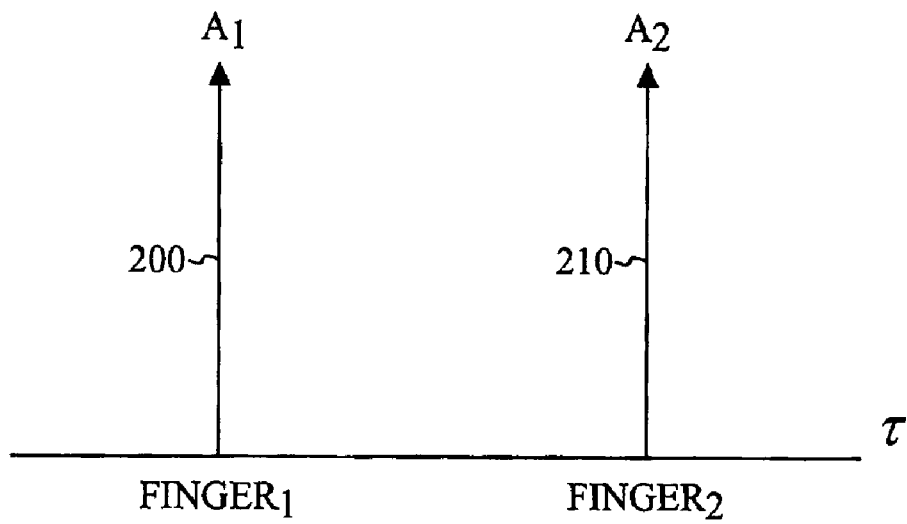
FIG. 2 shows non-transmit diversity signals detected at RAKE receiver fingers.
Figure 3:
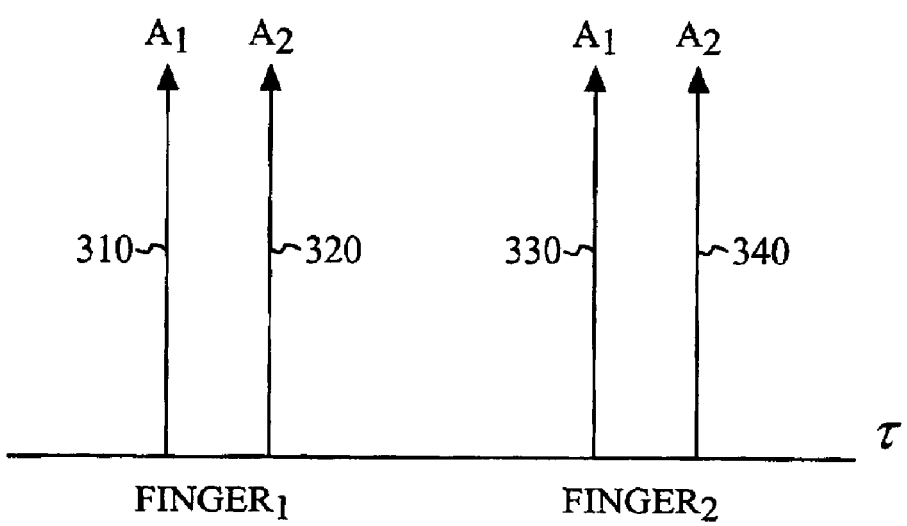
FIG. 3 shows transmit diversity signals detected at RAKE receiver fingers.

FIG. 2 and FIG. 3 illustrate the above-described phenomenon. In FIG. 2, a RAKE processor assigns $Finger_1$ (not shown) to a first multipath signal 200 received at a first time offset of a scrambling code and $Finger_2$ (not shown) to a second multipath signal 210 received at a second time offset of the scrambling code. The first multipath signal 200 directly interferes with the second multipath signal 210 as noise, and the second multipath signal 210 directly interferes with the first multipath signal 200 as noise. Hence, if the amplitude of the first multipath signal 200 decreases, then for the second multipath signal 210, the noise component of the signal to noise ratio (SNR) decreases.

Thus, if the SNR of one multipath decreases and the SNR of another multipath increases, then the overall SNR of the combined multipaths will increase as well, since the overall SNR is dependent upon the best SNR of the multipaths. This phenomenon is one of the benefits of using a multipath receiver in a spread spectrum communication system.

However, in a system with transmission diversity, this phenomenon disappears if a remote station cannot receive its signal from both antennas, such as the case with non-TD remote stations. In FIG. 3, a RAKE processor assigns $Finger_1$ to a first multipath signal 310 from a first antenna and a second multipath signal 320 from second antenna. The RAKE processor assigns $Finger_2$ to a third multipath signal 330 from the first antenna and a fourth multipath signal 340 from the second antenna. The magnitude of the interference between the first antenna and the second antenna is not correlated. Hence, if the first multipath signal 310 decreases in amplitude, then the amplitude of the second multipath signal 320 may remain the same. If the amplitude of the second multipath signal 320 remains the same, then the SNR of the third multipath signal 330 and the fourth multipath signal 340 will not fully benefit from the decreased interference from the first multipath signal 310. The second multipath signal 320 still interferes with the reception on $Finger_2$.

For a non-TD station that is operating in a transmission diversity system, the receiver fingers would capture, as an example, the first multipath signal 310 and the third multipath signal 330, but these signals would still be affected by the interference of the second multipath signal 320 and the fourth multipath signal 340. Hence, the gain arising from using multipath receivers is not realized for non-TD stations.

It should be noted again that the current state of the art envisions the support of non-TD remote station in transmission diversity systems by using only a primary antenna to transmit signals to the non-TD remote station, so that the non-TD remote station will receive modulation symbols that can be decoded by the non-TD remote station. However, due to the nature of spread spectrum communications, the TD base station is also transmitting to TD remote stations on both the primary and the auxiliary antennas. Hence, the non-TD remote station will receive interference from the auxiliary antennas, the magnitude of which is uncorrelated with the non-TD signal.

The embodiments that are described herein are for a transmission diversity system that supports both non-TD and TD remote stations while providing the gains associated with transmission diversity to non-TD remote stations. The embodiments are directed towards a switching apparatus that performs time-varying transformations upon signals that are to be transmitted to non-TD remote stations. In one embodiment, the time-varying transformations are performed upon the TD remote stations as well. The time-varying transformations upon signals destined for TD remote stations would allow an implementation that does not affect current requirements promulgated within the standards.

Figure 4A:
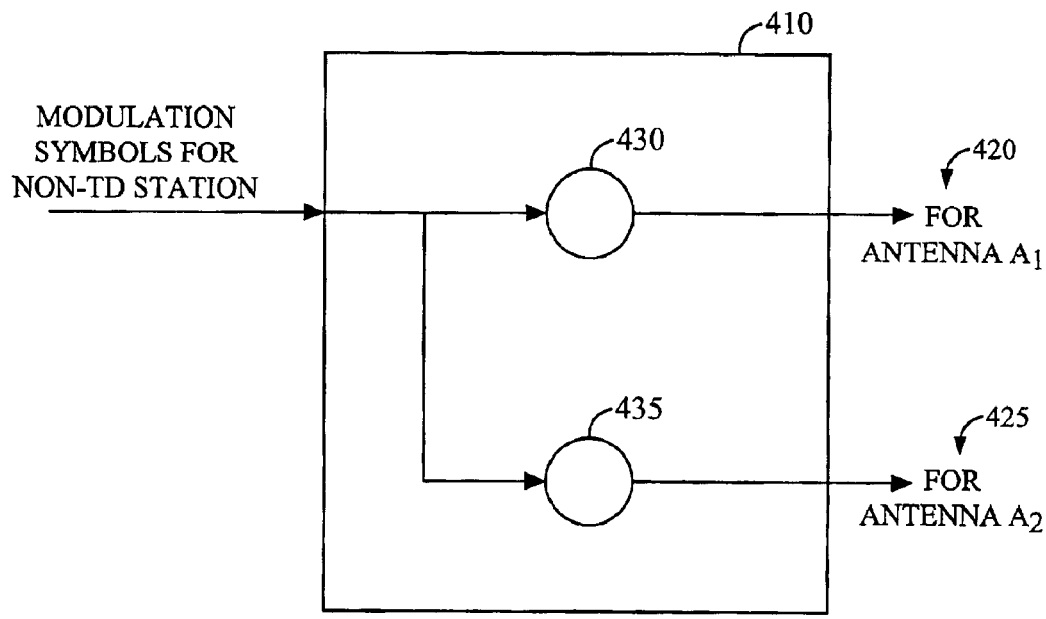
FIG. 4A is a block diagram of an apparatus that provides transmission diversity to non-TD remote stations.

FIG. 4A is a block diagram of an apparatus that provides transmission diversity to non-TD remote stations. A stream of modulation symbols, which are generated for a non-TD remote station, are input to a switching apparatus 410. Within the switching apparatus 410, the modulation symbols are split into two streams for transmission over a first antenna 420 or a second antenna 425. Before transmission over the first antenna 420 and the second antenna 425, a time-varying transformation is performed upon each stream. In one aspect, the first stream is modulated by a time-varying sine function 430 and the second stream is modulated by a time-varying cosine function 435.

Figure 4B:
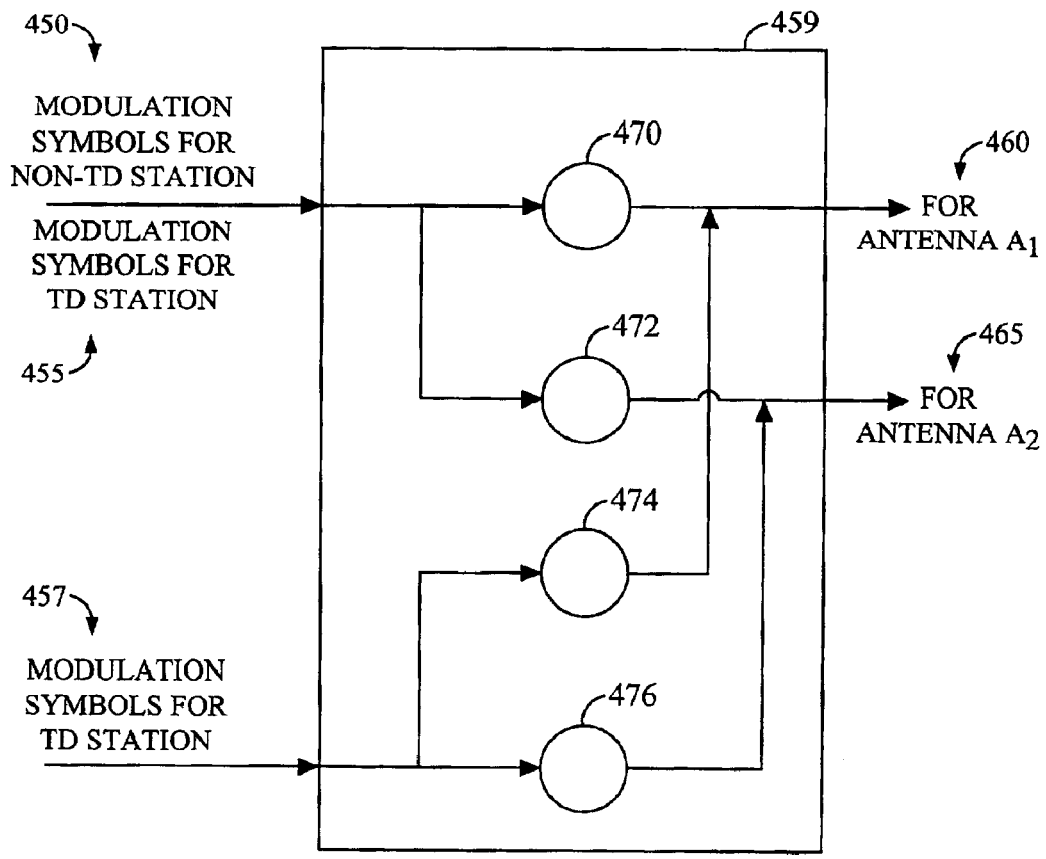
FIG. 4B is a block diagram of an apparatus that allows coexistence between non-TD remote stations and TD remote stations.

FIG. 4B is a block diagram of an apparatus that allows coexistence between non-TD remote stations and TD remote stations. A stream of modulation symbols 450 is generated for a non-TD remote station and streams of modulation symbols 455 and 457 are generated for TD remote stations. Within the switching apparatus 459, time-varying transformations are performed upon the streams of modulation symbols 450, 455, and 457. The stream of modulation symbols 450 and 455 are split into two streams for transmission over a first antenna 460 or a second antenna 465. Before transmission over the first antenna 460 and the second antenna 465, a time-varying transformation is performed upon each stream by transformation element 470 and transformation element 472.

The stream of modulation symbols 457 is split into two streams for transmission over the first antenna 460 and the second antenna 465. Before transmission, a time-varying transformation is performed upon each stream by transformation element 474 and transformation element 476. In one aspect of the embodiment, the transformation elements 470 and 476 can comprise time-varying sine functions and the transformation elements 472 and 474 can comprise time-varying cosine functions.

Figure 5A:
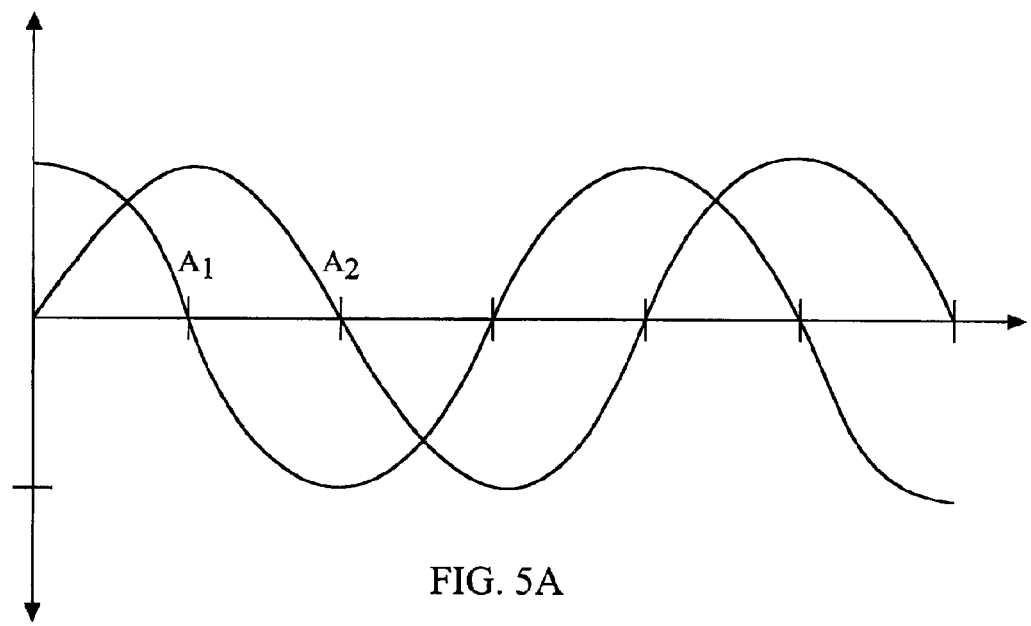
FIG. 5A is a graph of the output of two antennas using an embodiment of a switching apparatus.
Figure 5B:
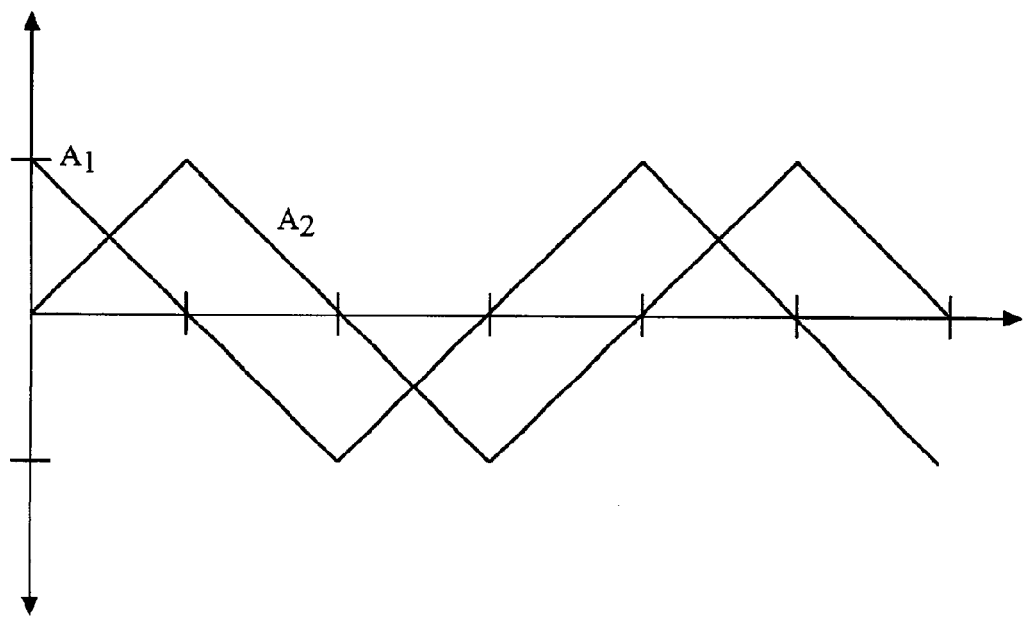
FIG. 5B is a graph of the output of two antennas using another embodiment of a switching apparatus.

FIG. 5A is a graph of the output of the first antenna 420 and the second antenna 430 using the above switching apparatus using sine and cosine generators. At time t=0, only transmissions from the first antenna 420 are observed. At time $0 < t < \pi/2$, the magnitude of the transmissions from the first antenna 420 decreases while the magnitude of the transmissions from the second antenna 430 increases. At time $t = \pi/2$, only transmissions from the second antenna 430 are observed. At time $\pi/2 < t < \pi$, the magnitude of the transmissions from the second antenna 430 decreases while the magnitude of the transmissions from the first antenna 420 increases. FIG. 5B is a graph of the output of two antennas using another embodiment of a switching apparatus using piece-wise linear transformations.

Using devices that can model periodic, time-varying sine and cosine functions within the switching apparatus will produce a time-varying effect that correlates the magnitude of the signals and interference on both antennas. In other aspects, other time-varying transformations can be performed to correlate the signals and the interference, such as, e.g., piece-wise linear functions that model saw-tooth waves. Hence, the output of the switching apparatus is a time-varying transformation of the original stream of modulation symbols. If the relative phase of each antenna transmission is set at an appropriate rate, such as, for example, 1 cycle per 20 ms frame, the received signal at any particular location does not remain poor.

The effects of the implementing the above embodiments can be described mathematically. If $A_1 >> A_2$, i.e., transmissions occur mostly on the primary antenna, then the fingers of the non-TD receiver will lock on to the signals from antenna $A_1$, with SNR as follows:

$$\frac{S}{N} = 10 \frac{A_1}{(A_1 + A_2)} \approx 10 \frac{A_1}{A_1} \approx 10.$$

But if switching occurs, then at some points, $A_1 << A_2$, and the fingers of the non-TD receiver will lock on to the signals from antenna $A_2$, with SNR as follows:

$$\frac{S}{N} = 10 \frac{A_2}{(A_1 + A_2)} \approx 10 \frac{A_2}{A_2} \approx 10.$$

The goal of the embodiments is to provide good coverage over portions of the interleaved modulation symbols in a reliable manner. In other words, within a frame of modulation symbols received by a remote station, there will occur corrupted bits and uncorrupted bits. However, due to the "rhythmic" interaction between the two antennas, the uncorrupted bits will arrive in good enough condition so that the receiver can effectively utilize the error control coding techniques described previously.

The above embodiments have been described in relation to a transmission diversity system. However, the embodiments can also be extended for the purpose of converting a system without transmission diversity into a system with the benefits of transmission diversity. In particular, the system without transmission diversity can be altered in order to attain the robustness of a system with transmission diversity. The switching apparatus can be communicatively coupled to non-TD base stations so that the stream of modulation symbols that would otherwise be transmitted on a single antenna could be transmitted on multiple antennas. Hence, if a remote station is out of the transmission path of one antenna, it may still be in the transmission path of another antenna.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. Apparatus for providing transmission diversity gains to a non-transmission diversity receiver, comprising:
   a switching apparatus for implementing at least two time-varying transformations to a single stream of modulation symbols so that the single stream of modulation symbols is transformed into at least two time-varying streams of modulation symbols, wherein the single stream of modulation symbols is targeted for transmission to the non-transmission diversity receiver, and further wherein the at least two time-varying transformations provide transmission diversity gains in signal-to-noise ratio to the non-transmission diversity receiver; and
   at least two antennas for transmitting the at least two time-varying streams of modulations symbols to the non-transmission diversity receiver.

2. The apparatus of claim 1, wherein the switching apparatus comprises a sine wave generator and a cosine wave generator.

3. The apparatus of claim 1, wherein the switching apparatus comprises at least two time-varying, saw-tooth wave generators.

4. A method for providing transmission diversity gains to a non-transmission diversity receiver, comprising:
   implementing a first time-varying transformation to a stream of modulation symbols to form a first transmission signal, wherein the stream of modulation symbols is targeted for transmission to the non-transmission diversity receiver;
   implementing a second time-varying transformation to the stream of modulation symbols to form a second transmission signal, wherein the second time-varying transformation has a different relative phase from the first time-varying transformation, wherein the first time-varying transformation and the second time-varying transformation provide transmission diversity gains in signal-to-noise ratio to the non-transmission diversity receiver; and
   transmitting the first transmission signal and the second transmission signal to the non-transmission diversity receiver.

5. The method of claim 4, wherein the first time-varying transformation is a sine transformation and the second time-varying transformation is a cosine transformation.

6. The method claim 4, wherein a relative phase between the sine transformation and the cosine transformation is one (1) cycle per frame.

7. The method of claim 4, wherein the first time-varying transformation is a piece-wise linear transformation with a first phase and the second time-varying transformation is a piece-wise linear transformation with a second phase, wherein the first phase and the second phase are separated by 1 cycle per frame.

8. Apparatus for providing transmission diversity gains to a non-transmission diversity receiver, comprising:
   means for implementing a first time-varying transformation to a stream of modulation symbols to form a first transmission signal, wherein the stream of modulation symbols is targeted for transmission to the non-transmission diversity receiver;
   means for implementing a second time-varying transformation to the stream of modulation symbols to form a second transmission signal, wherein the second time-varying transformation has a different relative phase from the first time-varying transformation, wherein the first time-varying transformation and the second time-varying transformation provide transmission diversity gains in signal-to-noise ratio to the non-transmission diversity receiver; and
   means for transmitting the first transmission signal and the second transmission signal to the non-transmission diversity receiver.

9. Apparatus for providing transmission diversity gains to a non-transmission diversity receiver, comprising:
   means for implementing at least two time-varying transformations to a single stream of modulation symbols so that the single stream of modulation symbols is transformed into at least two time-varying streams of modulation symbols, wherein the single stream of modulation symbols is targeted for transmission to the non-transmission diversity receiver, and further wherein the at least two time-varying transformations provide transmission diversity gains in signal-to-noise ratio to the non-transmission diversity receiver; and
   means for transmitting the at least two time-varying streams of modulations symbols to the non-transmission diversity receiver.

10. Apparatus for allowing non-transmission diversity remote stations to operate amidst transmission diversity remote stations in a transmission diversity system, comprising:
    a switching apparatus for implementing at least four time-varying transformations to streams of modulation symbols, wherein the first stream of modulation symbols is for a non-transmission diversity remote station and the remaining streams of modulation symbols are for a transmission diversity remote station, and further wherein the at least four time-varying transformations provide transmission diversity gains in signal-to-noise ratio to the non-transmission diversity receiver; and
    at least two antennas for transmitting the transformed streams of modulations symbols.

11. The apparatus of claim 10, wherein the at least four time-varying transformations are performed by at least two pairs of generators, wherein each pair comprise a sine wave generator and a cosine wave generator.

12. The apparatus of claim 10, wherein the at least four time-varying transformations are performed by at least two pairs of generators, wherein each pair comprise two time-varying, saw-tooth wave generators.

13. A method for allowing non-transmission diversity remote stations to operate amidst transmission diversity remote stations in a transmission diversity system, comprising:

implementing a first time-varying transformation upon a primary stream of modulation symbols and a secondary stream of modulation symbols to form a part of a first transmission signal, wherein the primary stream of modulation symbols is for a non-transmission diversity remote station and the secondary stream of modulation symbols is for a transmission diversity remote station;

implementing a second time-varying transformation upon the primary stream of modulation symbols and the secondary stream of modulation symbols to form a part of a second transmission signal, wherein the second time-varying transformation has a different relative phase from the first time-varying transformation;

implementing a third time-varying transformation to a tertiary stream of modulation symbols to form another part of the first transmission signal, wherein the tertiary stream of modulation symbols is for the transmission diversity remote station;

implementing a fourth time-varying transformation to the tertiary stream of modulation symbols to form another part of the second transmission signal; and transmitting the first transmission signal and the second transmission signal to the non-transmission diversity remote station and the transmission diversity remote station.

14. The method of claim 13, wherein the first and fourth time-varying transformations are a sine transformation and the second and third time-varying transformations are a cosine transformation.

15. The method of claim 14, wherein the first time-varying transformation is a piece-wise linear transformation with a first phase, the second time-varying transformation is a piece-wise linear transformation with a second phase, the third time-varying transformation is a piece-wise linear transformation with a third phase, and the fourth time-varying transformation is a piece-wise linear transformation with a fourth phase.

16. Apparatus for allowing non-transmission diversity remote stations to operate amidst transmission diversity remote stations in a transmission diversity system, comprising:

means for implementing a first time-varying transformation upon a primary stream of modulation symbols and a secondary stream of modulation symbols to form a part of a first transmission signal, wherein the primary stream of modulation symbols is for a non-transmission diversity remote station and the secondary stream of modulation symbols is for a transmission diversity remote station;

means for implementing a second time-varying transformation upon the primary stream of modulation symbols and the secondary stream of modulation symbols to form a part of a second transmission signal, wherein the second time-varying transformation has a different relative phase from the first time-varying transformation;

means for implementing a third time-varying transformation to a tertiary stream of modulation symbols to form another part of the first transmission signal, wherein the tertiary stream of modulation symbols is for the transmission diversity remote station;

means for implementing a fourth time-varying transformation to the tertiary stream of modulation symbols to form another part of the second transmission signal; and means for transmitting the first transmission signal and the second transmission signal to the non-transmission diversity remote station and the transmission diversity remote station.

17. Apparatus for allowing non-transmission diversity remote stations to operate amidst transmission diversity remote stations in a transmission diversity system, comprising:

means for implementing at least four time-varying transformations to streams of modulation symbols, wherein the first stream of modulation symbols is for a non-transmission diversity remote station and the remaining streams of modulation symbols are for a transmission diversity remote station, and further wherein the at least four time-varying transformations provide transmission diversity gains in signal-to-noise ratio to the non-transmission diversity receiver; and means for transmitting the transformed streams of modulations symbols.

* * * * *